United States Patent
Roh et al.

(10) Patent No.: US 8,944,304 B2
(45) Date of Patent: Feb. 3, 2015

(54) BREAKING APPARATUS FOR GLASS SUBSTRATE

(75) Inventors: Hyung-sang Roh, Incheon (KR); Ja-Yong Koo, Asan-si (KR); Sung Cheal Kim, Asan-si (KR); Won-Kyu Park, Cheonan-si (KR); Chang-Ha Lee, Asan-si (KR)

(73) Assignee: Corning Precision Materials Co., Ltd., Gumi-Si (KR)

( * ) Notice: Subject to any disclaimer, the term of this patent is extended or adjusted under 35 U.S.C. 154(b) by 309 days.

(21) Appl. No.: 13/541,177

(22) Filed: Jul. 3, 2012

(65) Prior Publication Data

US 2013/0292444 A1    Nov. 7, 2013

(30) Foreign Application Priority Data

May 4, 2012 (KR) .......................... 10-2012-0047394

(51) Int. Cl.
  *C03B 33/00*  (2006.01)
(52) U.S. Cl.
  USPC .......................................... 225/96.5; 225/96
(58) Field of Classification Search
  USPC ............... 225/2, 5, 94, 96, 96.5; 83/613–641, 83/694, 821
  See application file for complete search history.

(56) References Cited

U.S. PATENT DOCUMENTS

| 2,538,901 | A | * | 1/1951 | Fancher ......................... 225/103 |
| 5,381,713 | A |   | 1/1995 | Smith ............................ 83/881 |
| 7,047,858 | B2 | * | 5/2006 | Rohrer et al. .................... 83/582 |
| 7,888,899 | B2 | * | 2/2011 | Yeh et al. ....................... 318/560 |

FOREIGN PATENT DOCUMENTS

| JP | 2002-160933 A | 6/2002 |
| KR | 10-0660796 B1 | 12/2006 |
| KR | 10-0890764 B1 | 3/2009 |

* cited by examiner

*Primary Examiner* — Stephen Choi
(74) *Attorney, Agent, or Firm* — Stein IP, LLC

(57) ABSTRACT

Disclosed herein is a breaking apparatus for glass substrates. The breaking apparatus includes a breaking bar connected to a linear driver, a plurality of linear bushes longitudinally mounted on the breaking bar and each including an outer barrel, a plurality of buffer cylinders longitudinally mounted on the breaking bar, and a breaking tip extending in one direction and having a bar shape with a predetermined width. Each of the buffer cylinders includes a hollow cylinder body generating pressure therein, a piston received in the cylinder body, and a piston rod connected to the piston. The breaking tip is disposed in a longitudinal direction of the breaking bar beneath the breaking bar and connected to the piston rods and the shafts to be brought into contact with a glass substrate.

7 Claims, 4 Drawing Sheets

BREAKING APPARATUS FOR GLASS SUBSTRATE

CROSS-REFERENCE TO RELATED APPLICATIONS

This application claims the benefit of Korean Patent Application No. 10-2012-0047394, filed on May 4, 2012 in the Korean Intellectual Property Office, the entirety of which is incorporated herein by reference.

BACKGROUND OF THE INVENTION

1. Field of the Invention

The present invention relate to a breaking apparatus for glass substrates and, more particularly, to a breaking apparatus for glass substrate, which has an air buffering structure to prevent crack spreading and complete breakage of an abnormally scribed glass substrate in removal of a trim from the glass substrate.

2. Description of the Related Art

In manufacture of flat panel displays such as LCDs, PDPs, and the like, glass substrates are generally used. Glass substrates for flat panel displays are prepared in a large size sheet, which is cut to a suitable size for the flat panel displays.

There are various glass substrate cutting methods such as a wheel scribing method, a laser cutting method, and the like. The wheel scribing method employs a cutter wheel, and the laser cutting method employs laser beams. In these methods, a cutting line, for example a scribing line, is preliminarily formed on a surface of a glass substrate, and load is applied to the cutting line using a breaking bar to cut the glass substrate.

The conventional breaking apparatus has a compressing bar structure which includes a breaking bar vertically reciprocated by a drive unit such as an actuator.

When cutting a glass substrate using the conventional breaking apparatus, a breaking bar is disposed above the glass substrate to be positioned parallel to a scribing line previously formed on the glass substrate and is lowered to press the glass substrate along the scribing line such that a crack formed on the glass substrate along the scribing line is deepened, thereby cutting the glass substrate.

However, when cutting the glass substrate by any conventional method such as the wheel scribing method or the laser cutting method, scribing failure occurs in different ways depending on the kind of cutting method employed. For example, in the wheel scribing method, the glass substrate can undergo scribing failure due to abrasion of the scribing wheel or abnormal setup after replacement which results in non-generation of a lateral crack on the surface of the glass substrate and a median crack on a facet of the glass substrate.

The conventional breaking apparatus is operated simply by pressing the breaking bar. Thus, the breaking bar forcibly presses a trim of the substrate by applying the same stroke, irrespective of whether the glass substrate is successfully scribed or not, so that the glass substrate can be completely broken due to spreading of a lateral crack at a position of scribing failure.

As such, when the glass substrate is completely broken during the cutting process, it takes lots of time to remove the broken glass particles, thereby reducing productivity. Moreover, the broken fine glass particles cause contamination and scratches on the surface of the glass substrate for display panels which require a high degree of cleanliness, thereby causing reduction in yield and productivity.

SUMMARY OF THE INVENTION

The present invention is directed to solving the problems of the related art as described above and an aspect of the present invention is to provide a breaking apparatus for glass substrate, which has an air buffering structure to prevent crack spreading and complete breakage of an abnormally scribed glass substrate in removal of a trim from the glass substrate.

According to an aspect of the invention, a breaking apparatus for glass substrates includes: a breaking bar connected to a linear driver to be lifted or lowered and extending in one direction and having a predetermined width; a plurality of linear bushes longitudinally mounted on the breaking bar and each including an outer barrel and a shaft linearly slidable inside the outer barrel; a plurality of buffer cylinders longitudinally mounted on the breaking bar and each including a hollow cylinder body generating pressure therein, a piston received in the cylinder body, and a piston rod connected to the piston; and a breaking tip extending in one direction and having a bar shape with a predetermined width, the breaking tip being disposed in a longitudinal direction of the breaking bar beneath the breaking bar and being connected to the piston rods of the buffer cylinders and the shafts of the linear bushes to be brought into contact with a glass substrate and to apply impact load to the glass substrate when the breaking bar is lowered.

Additional aspects and/or advantages of the invention will be set forth in part in the description which follows and, in part, will be obvious from the description, or may be learned by practice of the invention.

BRIEF DESCRIPTION OF THE DRAWINGS

The above and other aspects, features, and advantages of the invention will become apparent from the detailed description of one exemplary embodiment in conjunction with the accompanying drawings.

DETAILED DESCRIPTION OF THE EMBODIMENTS

Figure 1:
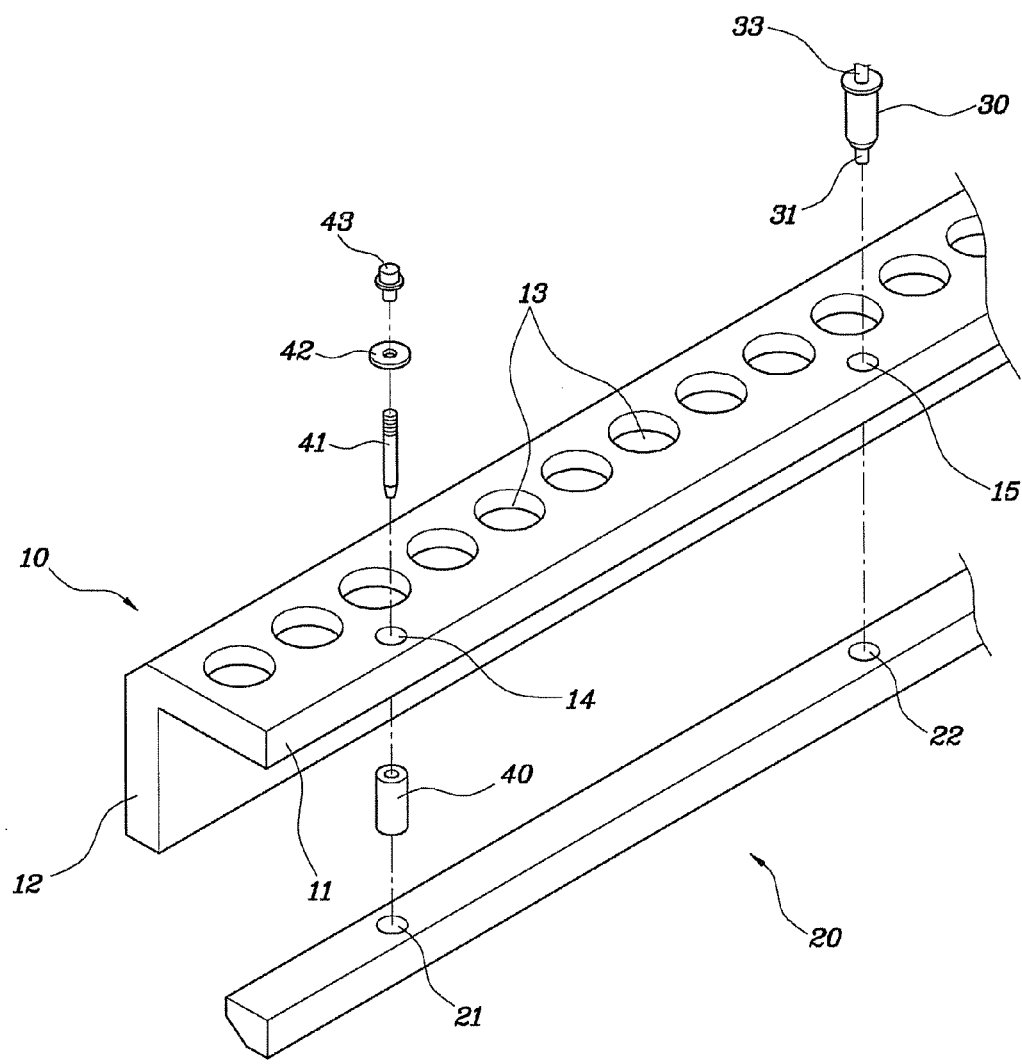
FIG. 1 is an exploded perspective view of a breaking apparatus for glass substrates according to one exemplary embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In accordance with one exemplary embodiment, a breaking apparatus includes a breaking tip disposed beneath a breaking bar to operate in cooperation with buffer cylinders and linear bushes and is configured to generate optimal pressure in the buffer cylinders so as to provide both a desired cutting function and high substrate quality, thereby preventing crack spreading and complete substrate breakage in a process of breaking a glass substrate undergoing scribing failure (that is, an abnormally scribed glass substrate), while realizing a desired breaking process of a glass substrate subjected to normal scribing (that is, a normally scribed glass substrate).

Figure 2:
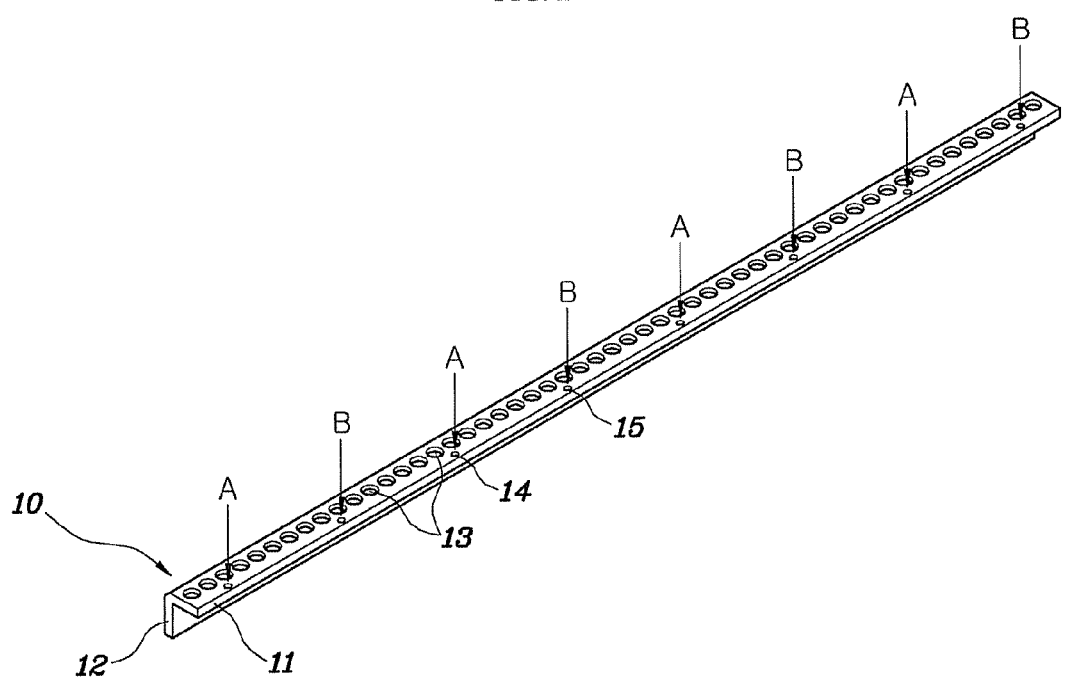
FIG. 2 is a graph depicting desired arrangement of buffer cylinders and linear bushes of the breaking apparatus according to the exemplary embodiment of the present invention.

FIG. 1 is an exploded perspective view of a breaking apparatus for glass substrates according to one exemplary embodiment of the invention, and FIG. 2 is a graph depicting desired arrangement of buffer cylinders and linear bushes of the breaking apparatus according to the exemplary embodiment. For reference, in FIG. 2, reference marks 'A' indicate mounting positions of the linear bushes and reference marks 'B' indicate mounting positions of the buffer cylinders.

Referring to FIG. 1, a breaking apparatus for glass substrates according to one exemplary embodiment is part of an apparatus for machining a glass substrate. More specifically, the breaking apparatus is used to break a glass substrate 1 along a scribing line 2 formed on the glass substrate 1 by applying impact load to the scribing line 2 in a scribing process which is performed prior to a process of cutting the glass substrate. The breaking apparatus includes a processing table 70, a linear driver (not shown), a breaking bar 10, linear bushes, buffer cylinders, and a breaking tip 20. The breaking apparatus according to the exemplary embodiment is configured to perform buffering operation only to the glass substrate 1 which undergoes scribing failure.

In the breaking apparatus according to the embodiment, the processing table 70 is provided as a base, on which the glass substrate 1 is seated and supported during a breaking process with respect to the glass substrate 1 having the scribing line 2 formed thereon, and is manufactured to have high flatness and high precision. The processing table 70 is provided on an upper surface thereof with a flexible smooth sheet or pad, which prevents surface damage of the glass substrate 1 seated on the upper surface of the processing table 70 during the breaking process.

In this embodiment, the linear driver includes a drive shaft which is operated by an electric motor, hydraulic pressure or air pressure to reciprocate along a linear trace in a vertical direction. The linear driver may be a linear actuator. The driver shaft is connected to the breaking bar 10 to allow the breaking bar 10 to be linearly lifted or lowered in the vertical direction.

In this embodiment, the linear bushes, buffer cylinders and breaking tip 20 are mounted on the breaking bar 10. The breaking bar 10 has a predetermined width and is elongated in one direction. At least parts of the breaking bar 10, on which the linear bushes, buffer cylinders and the breaking tip 20 are mounted, will be brought into contact with an upper surface of the glass substrate.

The breaking bar 10 is lifted or lowered perpendicular to the glass substrate seated on the processing table 70. Specifically, the breaking bar 10 is connected to the linear driver to be lifted or lowered above the glass substrate in cooperation with reciprocation of the drive shaft of the linear driver.

Thus, when a stroke preset by the linear driver is applied downwards, the breaking bar 10 linearly descends the breaking tip 20 connected to the breaking bar 10, and the descending breaking tip 20 applies instantaneous strong force to the glass substrate on the processing table 70, so that the glass substrate is cut.

Further, according to the embodiment, the breaking apparatus is configured to adjust a descending speed of the breaking bar, stoppage duration of the breaking bar at the lowermost position, air pressure supplied to the actuator to compress the glass substrate, and the like.

In FIG. 1, the breaking bar 10 according to the embodiment is a bar member which is composed of a horizontal plate 11 and a vertical plate 12 assembled to have an "⌐"-shaped cross section. The breaking bar 10 is disposed to have a major axis parallel to the glass substrate seated on the processing table 70. Specifically, the breaking bar 10 is disposed such that the horizontal plate 11 is vertically separated from the upper surface of the glass substrate and the vertical plate 12 is separated a predetermined distance from an edge of the glass substrate.

Further, the linear bushes and the buffer cylinders are mounted on the horizontal plate 11 of the breaking bar 10. In an exemplary embodiment, the linear bushes and the buffer cylinders are inserted into linear bush coupling holes 14 and buffer cylinder coupling holes 15 formed through the horizontal plate 11 of the breaking bar 10.

Further, the linear bushes and the buffer cylinders are secured to the horizontal plate 11 of the breaking bar 10. Preferably, the linear bushes and buffer cylinders are located at one end of the horizontal plate 11 of the breaking bar 10, as shown in FIG. 1. More preferably, a plurality of linear bushes and a plurality of buffer cylinder are alternately arranged at regular intervals in a longitudinal direction of the breaking bar 10, as shown in FIG. 2. Since scribing failure can occur at various positions on the glass substrate, this structure ensures that cushioning pressure is uniformly applied to all parts of the glass substrate even when scribing failure occurs on the glass substrate.

Further, the breaking bar 10 is formed with a plurality of air passages 13, which prevent generation of turbulence or vortex caused by air resistance or friction to a lower surface of the horizontal plate 11 of the breaking bar when the breaking bar is rapidly lowered and applies impact load to the glass substrate.

Accordingly, the breaking apparatus may have an effect of preventing the glass substrate from suffering surface contamination or scratch due to spreading of fine glass cullet by turbulence or vortex during breaking operation.

In this embodiment, the linear bushes serve to support the breaking tip 20 such that the breaking tip 20 can be disposed beneath the breaking bar 10. Further, the linear bushes allow the breaking tip 20 to perform buffering operation by guiding the breaking tip 20 to move linearly instead of laterally moving when the breaking tip 20 applies instantaneous impact load to the glass substrate.

The linear bush generally includes an outer barrel 40 and a shaft 41, which linearly reciprocates inside the outer barrel 40 while sliding therein. Various bushes known in the art may be used as the linear bushes. For example, the linear bush may be a ball bearing type linear bush that includes an outer barrel 40 having a plurality of balls therein, and a shaft 41 penetrating both ends of the outer barrel 40 and having a cylindrical rod shape to be slid by the balls which are linearly arranged in a moving direction of the shaft 41.

Further, according to the embodiment, the linear bush is provided with a washer 42 and a tightening cap 43 at an upper end of the shaft 41 (that is, a portion of the shaft 41 protruding from an upper surface of the horizontal plate 11 of the breaking bar). An initial position of the shaft 41 inside the outer barrel 40 may be adjusted by disposing the washer 42 to be supported on the upper surface of the horizontal plate 11 and adjusting the degree of tightening the tightening cap 43 to the shaft 41.

In the embodiment shown in FIG. 1, the breaking apparatus includes a plurality of linear bushes linearly arranged in the longitudinal direction of the breaking bar 10 on the horizontal plate 11 of the breaking bar 10. Here, at least one of the linear bushes is disposed between adjacent buffer cylinders.

More preferably, with two linear bushes mounted on opposite sides of the breaking bar 10, the plural linear bushes and the plural buffer cylinders are alternately arranged at predetermined intervals along the breaking bar 10, as shown in FIG. 2.

Further, according to the embodiment, the outer barrel 40 of each of the linear bushes is securely inserted into the linear bush coupling hole 14 in the horizontal plate 11 of the breaking bar 10, and a lower end of the shaft 41 penetrating the outer barrel 40 protrudes from a lower side of the horizontal plate 11 of the breaking bar 10.

The lower end of the shaft 41 protruding from the lower side of the horizontal plate 11 is coupled to the breaking tip 20 to support the breaking tip 20 while allowing the breaking tip 20 to be stably moved in the vertical direction during buffering of the breaking tip 20.

The buffer cylinder is connected to the breaking tip 20 to provide a cushioning function when the breaking tip 20 applies impact load to the abnormally scribed glass substrate, thereby preventing lateral cracks from spreading and the glass substrate from being completely broken thereby.

In the embodiment of FIG. 1, the buffer cylinder may be realized by an air cylinder which maintains constant pressure using fluid supplied into the cylinder. In one embodiment, the air cylinder includes a hollow cylinder body 30, a piston 32 linearly moved inside the cylinder, and a piston rod 31 connected at one side thereof to the piston 32 and having the other end protruding outside the cylinder to apply load to the piston 32 when cutting the glass substrate.

Further, the cylinder body 30 of the air cylinder is connected to one side of a pneumatic line 33, the other side of which is connected to a compressing device 60 (for example, an electric motor) and a regulator 50. When fluid is supplied into the cylinder body 30 through the pneumatic line 33, the fluid in the cylinder body 30 is compressed to maintain a preset pressure.

As described above, for the breaking apparatus according to the invention, the pressure generated in the cylinder body 30 acts as a buffering force to provide a cushioning effect during the breaking process. Further, the preset pressure (that is, buffering force of the air cylinder) may be adjusted by the regulator, as needed.

Further, according to the embodiment, the breaking apparatus includes a plurality of buffer cylinders disposed on the horizontal plate 11 of the breaking bar 10, and the plural buffer cylinders may be disposed at regular intervals in the longitudinal direction of the breaking bar 10.

Referring to FIG. 1, in the buffer cylinder according to the embodiment, the cylinder body 30 is inserted into a buffer cylinder coupling hole 15 formed in the horizontal plate 11 of the breaking bar 10, and the piston rod 31 protrudes from the lower side of the horizontal plate 11 of the breaking bar.

The piston rod 31 protruding from the lower side of the horizontal plate 11 of the breaking bar is coupled at a lower end thereof to the breaking tip 20 to transfer impact to the piston 32 when the impact occurs upon compression of the breaking tip 20 on the abnormally scribed glass substrate, so that the impact can be reduced by buffering force of the cylinder.

For reference, the embodiment shown in FIG. 1 provides a cylinder type buffering device which employs the fluid such as air, but the present invention is not limited thereto. In another embodiment, a resilient member such as a coil spring may be inserted into the cylinder such that pressure is applied to the piston 32 inside the cylinder piston 32 when the resilient member is compressed. In this case, the preset pressure of the buffer cylinder may be maintained by adjusting the compressed degree of the resilient member.

In this embodiment, the breaking tip 20 is mounted on the lower surface of the horizontal plate 11 of the breaking bar and will be brought into contact with the glass substrate to apply impact load to the glass substrate. The breaking tip 20 extends in one direction and has a bar shape with a predetermined width. The breaking tip 20 is longitudinally disposed parallel to the breaking bar 10.

When a stroke preset by the linear driver is applied downwards, the breaking tip 20 coupled to the breaking bar 10 is linearly lowered and applies instantaneous strong force to the glass substrate on the processing table 70, thereby cutting the glass substrate.

Further, the breaking tip 20 is connected to the shafts 41 of the linear bushes and the piston rods 31 of the buffer cylinders, which are provided to the horizontal plate 11 of the breaking bar 10, to realize a cushioning effect through the buffer cylinders and to be guided for vertical movement by the linear bushes during the breaking process of the glass substrate.

In the embodiment of FIG. 1, the breaking tip 20 is formed at an upper surface thereof with a shaft fastening hole 21 and a piston rod fastening hole 22 such that each of the shafts 41 of the linear bushes is coupled to the shaft fastening hole 21 and each of the piston rods 31 of the buffer cylinders is coupled to the piston rod fastening hole 22.

Further, the breaking tip 20 may be formed of a rigid body such as a metal member to allow all of the air cylinders to perform buffering operation irrespective of a position of scribing failure on the glass substrate.

Figure 3:
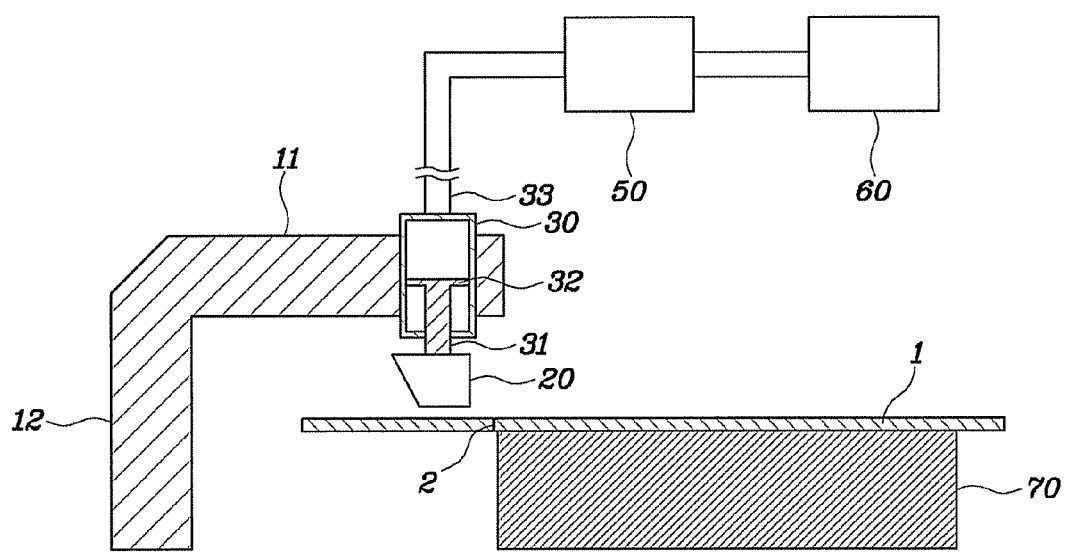
FIG. 3 is a schematic cross-sectional view explaining cutting operation of the breaking apparatus according to the exemplary embodiment of the present invention.

FIG. 3 is a schematic cross-sectional view explaining cutting operation of the breaking apparatus according to the exemplary embodiment of the present invention.

When a glass substrate having a scribing line formed through a scribing process is disposed on the processing table 70, the breaking apparatus performs a breaking process.

Referring to FIG. 3, the breaking tip 20 connected to the breaking bar 10 is linearly lowered by the linear driver and applies instantaneous strong impact load to the glass substrate on the processing table.

Here, for a normally scribed glass substrate, a trim is removed from the glass substrate without cushioning by the buffer cylinders, thereby providing a clean cut surface to the glass substrate after the breaking process.

For an abnormally scribed glass substrate, cushioning is performed by the buffer cylinders. In other words, since the descending speed or force of the breaking tip is relieved and absorbed by the buffer cylinders connected to the breaking tip as soon as the breaking tip contacts an upper surface of the glass substrate while descending, impact load applied to the glass substrate is reduced, thereby preventing complete breakage of the glass substrate caused by spreading of lateral cracks on the glass substrate.

Accordingly, in the breaking apparatus according to the invention, the buffer cylinder is configured to perform buffering operation with pressure determined in consideration of the minimum load for cutting the trim from the normally scribed glass substrate and the maximum allowable load which does not cause spreading of lateral cracks when breaking the trim of the abnormally scribed glass substrate.

As described above, in the breaking apparatus for glass substrates according to the embodiment, the breaking tip 20 is disposed beneath the breaking bar 10 to perform breaking operation in cooperation with the buffer cylinders and the linear bushes.

Particularly, in order to allow all of the buffer cylinders to perform buffering operation irrespective of a location of scribing failure on the glass substrate, it is important that the breaking tip 20 have a rigid body. However, since the breaking tip 20 is likely to be bent due to a relatively long length compared with a cross-sectional area thereof, the breaking tip 20 does not act as a rigid body due to structural features thereof. For example, upon removal of a trim from the glass substrate which undergoes scribing failure near one end of the glass substrate, the corresponding buffer cylinders may provide the cushioning effect, but other buffer cylinders do not provide the cushioning effect, since load is not transferred to the air cylinders due to bending of the breaking tip 20. As a result, the breaking tip 20 may also perform buffering operation.

Further, a main objective of the present invention is to prevent crack spreading and complete breakage of an abnormally scribed glass substrate. However, since normal scribing is performed in most cases in the process of cutting a glass substrate, it is also important for the breaking apparatus to provide main functions thereof.

Thus, it is important for the breaking apparatus to prevent complete breakage of the abnormally scribed glass substrate, and to provide main functions and high quality when cutting a normally scribed glass substrate. This requirement may be achieved by setting pressure (that is, buffering force) of the buffer cylinders and a gradient of the breaking tip.

The inventor of the present invention conducted pilot testing to obtain quantitative setup through selection of optimal pressure which allows the breaking apparatus to prevent complete breakage of the abnormally scribed glass substrate and to provide main functions and high quality.

Pilot testing was conducted with respect to a glass substrate which was subjected to laser cutting. Since load for breaking the glass substrate subjected to laser cutting is typically higher than the load for cutting a glass substrate subjected to wheel cutting, quantitative setup and test results obtained by this test may also be applied to a cutter wheel type breaking apparatus.

Table 1 shows test data relating to cutting operation and generation of lateral crack according to pressure of buffer cylinders with respect to a normally scribed glass substrate and a glass substrate undergoing scribing failure at locations of 100 mm, 1000 mm, and 1600 mm.

Figure 4:
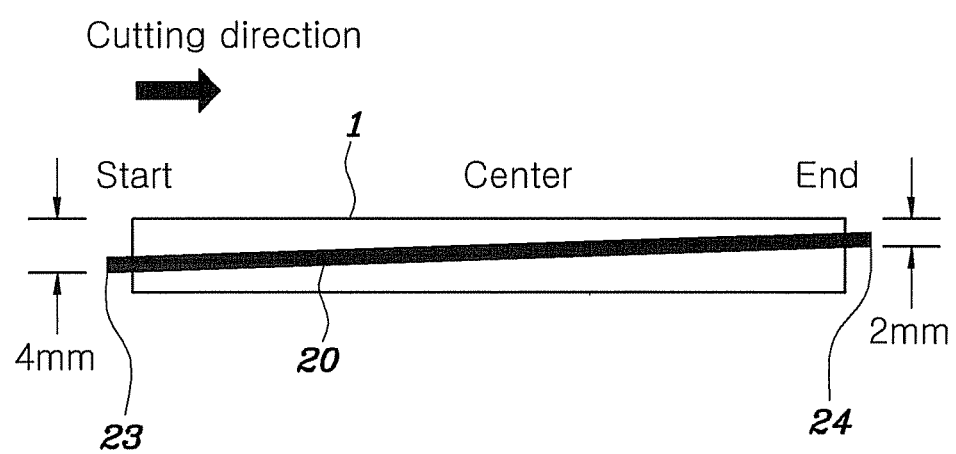
FIG. 4 is a cross-sectional view of a breaking tip of the breaking apparatus according to the exemplary embodiment of the present invention, when lowered to out a glass substrate.

For reference, in the test of Table 1, air cylinders were used as the buffer cylinders and the breaking tip was a '4-2 (initial section: 4 mm, terminal section: 2 mm)' type breaking tip, as shown in FIG. 4. In other words, the break tip has an upward gradient to be inclined upwards from a left end thereof towards a right end thereof such that the left end (initial section, 23) of the breaking tip is lowered to a depth of 4 mm from an upper surface of a glass substrate and the right end thereof (terminal section, 24) is lowered to a depth of 2 mm therefrom when the breaking tip is lowered.

Further, in the test of Table 2, air cylinders were used as the buffer cylinders and the breaking tip was a '2-4 (initial section: 2 mm, terminal section: 4 mm)' type breaking tip.

In Tables 1 and 2. 'o' indicates success in removal of a trim from a glass substrate without complete breakage and 'X' indicates breakage (failure in trim removal).

TABLE 1

| Pressure of air cylinder (Mpa) | Normally scribed glass substrate | Scribing Failure Location (mm) | | |
|---|---|---|---|---|
| | | 100 | 1000 | 1600 |
| 0 | X | O | X | X |
| 0.1 | X | O | O | X |
| 0.2 | O | O | O | O |
| 0.3 | O | O | O | O |
| 0.4 | O | O | O | O |
| 0.5 | O | O | O | O |
| 0.6 | O | O | O | O |
| 0.65 | O | O | O | O |

TABLE 2

| Pressure of air cylinder (Mpa) | Normally scribed glass substrate | Scribing Failure Location (mm) | | |
|---|---|---|---|---|
| | | 100 | 1000 | 1600 |
| 0 | X | X | X | X |
| 0.1 | X | X | X | X |
| 0.2 | O | O | O | O |
| 0.3 | O | O | O | O |
| 0.4 | O | O | O | O |
| 0.5 | O | O | O | O |
| 0.6 | O | O | O | O |
| 0.65 | O | O | O | O |

As can be seen from Tables 1 and 2, the breaking apparatus for glass substrates according to the invention prevented complete breakage of the glass substrate caused by spreading of lateral cracks in both tests. In particular, the '4-2 (initial section: 4 mm, terminal section: 2 mm)' type breaking tip exhibited superior performance (success rate of removing a trim) to the '2-4 (initial section: 2 mm, terminal section: 4 mm)' type breaking tip.

Further, it can be seen that a stable cutting function is obtained at an air cylinder pressure of 0.2 Mpa or more. That is, when the air cylinder is set to a pressure (buffering force) of 0.2 Mpa or more, the breaking apparatus may perform breaking operation with respect to the abnormally scribed glass substrate without spreading of lateral crack and may perform efficient removal of a trim from the normally scribed glass substrate.

For reference, since the air cylinder having an inner diameter of 4 mm has a maximum pressure of 0.65 Mpa and there is no need to calculate the maximum load in application of the breaking process, the inventor did not conduct testing to obtain the maximum load.

In particular, the inventor ascertained that it was more advantageous in terms of right angle quality on a cross-section when the breaking tip 20 was a '4-2 (initial section: 4 mm, terminal section: 2 mm)' type breaking tip and the buffer cylinders were set to a pressure of 0.4 Mpa or more.

Accordingly, the inventor conducted reproducibility testing several times using a '4-2 (initial section: 4 mm, terminal section: 2 mm)' type breaking tip with the buffer cylinders set to a pressure (0.5 Mpa), which was advantageous in terms of right angle quality while ensuring stable breaking function.

As a result of the reproducibility testing, it was ascertained that a plurality of glass substrates subjected to the cutting process using the breaking apparatus according to the invention had a good degree of right angle distributed in the range of 90±1 degrees.

As described above, the breaking apparatus for glass substrates according to the invention includes the breaking tip 20, which is disposed beneath the breaking bar 10 to perform buffering operation in cooperation with the buffer cylinders and the linear bushes, thereby preventing crack spreading and complete breakage of an abnormally scribed glass substrate during a breaking process.

Further, when removing a trim from a normally scribed glass substrate, the breaking apparatus according to the invention may realize good breaking performance with high right angle quality on a cross-section under conditions, such as pressure of buffer cylinders and a gradient of the breaking tip, which may provide both desired functions and quality.

As such, according to the exemplary embodiments, the breaking apparatus prevents complete breakage of an abnormally scribed glass substrate in removal of a trim from the glass substrate, and may realize satisfactory cutting performance with high quality of right angles on a cross-section for a normally scribed glass substrate. Thus, the breaking apparatus may improve productivity by significantly reducing time for removing broken glass particles, and may ensure a clean process environment, thereby enhancing quality of glass substrates for display panels.

Although some embodiments have been described herein, it should be understood by those skilled in the art that these embodiments are given by way of illustration only, and that various modifications, variations, and alterations can be made without departing from the spirit and scope of the invention. Therefore, the scope of the invention should be limited only by the accompanying claims and equivalents thereof.

What is claimed is:

1. A breaking apparatus for cutting a glass substrate disposed on a processing table along a scribing line, comprising:
    a breaking bar connected to a linear driver to be lifted or lowered and extending in one direction and having a predetermined width, the breaking bar having a plurality of linear bush coupling holes and a plurality of buffer cylinder coupling holes alternately arranged at regular intervals in the one direction;
    a plurality of linear bushes mounted on the plurality of linear bush coupling holes, each of the plurality of linear bushes including an outer barrel and a shaft linearly slidable inside the outer barrel;
    a plurality of buffer cylinders mounted on the plurality of buffer cylinder coupling holes, each of the plurality of buffer cylinders including a hollow cylinder body generating pressure therein, a piston received in the cylinder body, and a piston rod connected to the piston; and
    a breaking tip extending in the one direction and having a bar shape with a predetermined width, the breaking tip being disposed beneath the breaking bar and being connected to the piston rods of the buffer cylinders and the shafts of the linear bushes to be brought into contact with a glass substrate and to apply impact load to the glass substrate when the breaking bar is lowered.

2. The breaking apparatus of claim 1, wherein the buffer cylinders are air cylinders and the pressure generated in the air cylinders is kept constant.

3. The breaking apparatus of claim 2, wherein the pressure is at least 0.2 MPa or more.

4. The breaking apparatus of claim 1, wherein the breaking bar comprises a horizontal plate and a vertical plate assembled to have a "⌐" shape, and the linear bushes and the buffer cylinders are separated from each other on the horizontal plate in a longitudinal direction of the horizontal plate such that at least one linear bush is disposed between adjacent buffer cylinders.

5. The breaking apparatus of claim 4, wherein the horizontal plate is formed with the plurality of linear bush coupling holes and the plurality of buffer cylinder coupling holes, the outer barrels of the linear bushes being inserted into the linear bush coupling holes, the cylinder bodies of the buffer cylinders being inserted into the buffer cylinder coupling holes, and the breaking tip is attached to the shafts protruding from a lower side of the horizontal plate through the outer barrels and to the piston rods protruding from the lower side of the horizontal plate through the cylinder bodies to be disposed under the horizontal plate.

6. The breaking apparatus of claim 4, wherein the horizontal plate is formed with a plurality of air passages therethrough.

7. The breaking apparatus of claim 1, wherein the breaking tip has a rigid body and is upwardly slanted from one end to the other end in a longitudinal direction thereof.

\* \* \* \* \*